United States Patent
Li et al.

(10) Patent No.: US 9,857,619 B2
(45) Date of Patent: Jan. 2, 2018

(54) DISPLAY PANEL

(71) Applicant: Wuhan China Star Optoelectronics Technology Co., Ltd., Wuhan, Hubei (CN)

(72) Inventors: Yafeng Li, Guangdong (CN); Xiangyi Peng, Guangdong (CN)

(73) Assignee: Wuhan China Star Optoelectronics Technology Co., Ltd, Wuhan, Hubei (CN)

( * ) Notice: Subject to any disclaimer, the term of this patent is extended or adjusted under 35 U.S.C. 154(b) by 0 days.

(21) Appl. No.: 15/009,547

(22) Filed: Jan. 28, 2016

(65) Prior Publication Data

US 2017/0123264 A1 May 4, 2017

(30) Foreign Application Priority Data

Oct. 29, 2015 (CN) .......................... 2015 1 07165090

(51) Int. Cl.
| | |
|---|---|
| *H01L 27/14* | (2006.01) |
| *G02F 1/1335* | (2006.01) |
| *G02F 1/1339* | (2006.01) |
| *G02F 1/1362* | (2006.01) |
| *G02F 1/1368* | (2006.01) |

(52) U.S. Cl.
CPC ...... *G02F 1/133512* (2013.01); *G02F 1/1368* (2013.01); *G02F 1/13394* (2013.01); *G02F 1/133514* (2013.01); *G02F 1/136259* (2013.01); *G02F 1/136286* (2013.01); *G02F 2001/136295* (2013.01)

(58) Field of Classification Search
CPC .................................................... H01L 27/1214
USPC ............................................. 257/59, 72, 258
See application file for complete search history.

(56) References Cited

U.S. PATENT DOCUMENTS

| | | | | |
|---|---|---|---|---|
| 8,810,765 | B2* | 8/2014 | Okabe ................. | H01L 27/3246 257/184 |
| 2010/0182530 | A1* | 7/2010 | Fujikawa .............. | G02F 1/1339 349/58 |
| 2014/0253856 | A1* | 9/2014 | Nakahata .............. | H01L 51/525 349/139 |

\* cited by examiner

*Primary Examiner* — Tan N Tran

(74) *Attorney, Agent, or Firm* — Andrew C. Cheng

(57) ABSTRACT

The present disclosure discloses a display panel, including a color filter plate substrate and an array substrate; the color filter plate substrate includes a black matrix and a protective layer; the color filter plate substrate and the array substrate are disposed opposite; the protective layer is disposed on a side of the black matrix oriented to the array substrate in a laser incidence region during laser repair. The protective layer is disposed on a side of the black matrix oriented to the array substrate in a laser incidence region during laser repair according to the disclosure, therefore, the preventive layer can protect the black matrix during laser repair from forming a through-hole on the black matrix that can leak light.

4 Claims, 1 Drawing Sheet

DISPLAY PANEL

FIELD OF THE INVENTION

The present disclosure relates to a display technology field, and more particularly to a display panel.

BACKGROUND OF THE INVENTION

As well known, laser technology is the most common technique in low temperature poly-silicon (LTPS) technology, which is widely applied in point repair, line repair and laser annealing, however, during repair, the laser can penetrate an array substrate due to high intensity of the laser and impact on a black matrix on a color filter plate substrate, which makes a through-hole on the black matrix that can leak light.

SUMMARY OF THE INVENTION

The technical issue that the embodiment of the present invention solves is to provide a display panel that can prevent light leakage of a black matrix due to laser repair.

The present disclosure provides a display panel to solve the technical problem above, including: a color filter plate substrate and an array substrate; the color filter plate substrate includes a black matrix and a protective layer; the color filter plate substrate and the array substrate are disposed opposite; the protective layer is disposed on a side of the black matrix oriented to the array substrate in a laser incidence region during laser repair.

The protective layer is an organic material layer.

The protective layer is formed by a plurality of alternate spacer disposed on the black matrix layer.

The array substrate includes a thin film transistor (TFT) and a metal wire, the spacer is disposed on a black matrix of a position corresponding to the TFT and metal wire.

The spacer is also disposed on a black matrix of a position corresponding to a peripheral region of the array substrate, a contact area of the spacer corresponding to the TFT and metal wire, and the black matrix is larger than a contact area of the spacer corresponding to the peripheral region of the array substrate and the black matrix.

Distribution of the each spacer corresponding to the TFT and metal wire is more compact than that of the each spacer corresponding to the peripheral region of the array substrate.

A contact area of the spacer corresponding to the TFT and metal wire, and the black matrix is larger than a contact area of the spacer corresponding to the peripheral region of the array substrate and the black matrix.

Advantages of the disclosure: distinguishing from a conventional technique, a protective layer is disposed on a side of the black matrix oriented to the array substrate in a laser incidence region during laser repair according to the disclosure, therefore, the preventive layer can protect the black matrix during laser repair from forming a through-hole on the black matrix that can leak light.

DETAILED DESCRIPTION OF PREFERRED EMBODIMENTS

Figure 1:
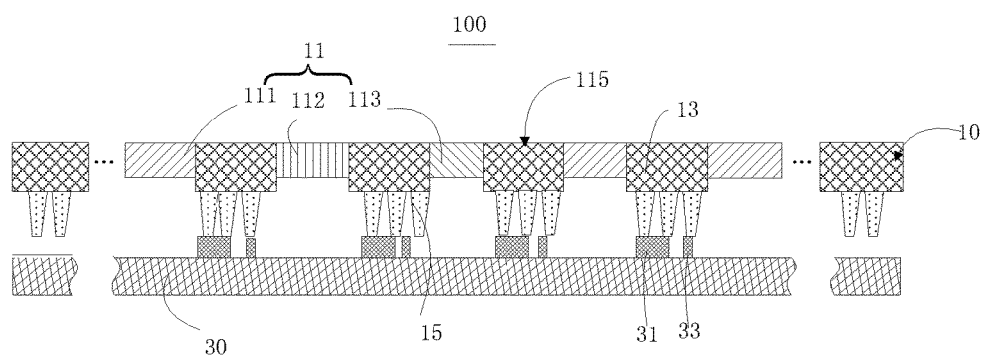
FIG. 1 is a structural diagram of a display panel according to a first embodiment of the present disclosure.

Referring to FIG. 1, a display panel 100 according to a first embodiment of the disclosure includes a color filter plate substrate 10 and an array substrate 30, the color filter plate substrate 10 is formed on one side of a base substrate, the color filter plate substrate 10 and the array substrate 30 are disposed opposite. The display panel 100 is a liquid crystal display panel.

Similarly, the color filter plate substrate 10 includes light resistors 11, a black matrix 13 and a protective layer 15. The light resistors 11 includes at least resistors of three colors, in the embodiment, the resistance includes resistors of three colors, respectively are a red light resistor 111, a green light resistor 112, a blue light resistor 113. The red light resistor 111, the green light resistor 112, the blue light resistor 113 need to be formed on a corresponding region respectively, and the red light resistor 111, the green light resistor 112, the blue light resistor 113 are disposed alternately, therefore, a gap 115 is formed between two adjacent resistors 11.

Black matrixes 13 are formed alternately in the gap 115, therefore, the black matrixes 13 are disposed between two adjacent resistors 11.

Similarly, the black matrixes 13 can partially overlapped regions with contact areas of the red light resistor 111, the green light resistor 112, and the blue light resistor 113 along directions of the color filter plate substrate 10 respectively.

A protective layer 15 is disposed on a side of the black matrix 13 oriented to the array substrate 30 in a laser incidence region during laser repair, therefore, during repair process of the display panel 100, the laser is incident along a path from the array substrate 30 oriented to the color filter plate substrate 10, when intensity of the laser is excessive, the laser impacts on the protective layer 15 directly, which can prevent light leakage of the black matrixes 13 due to a through-hole defined by the powerful laser.

The protective layer 15 is an organic material layer.

The protective layer 15 is formed by a plurality of alternate spacer disposed on the black matrix 13. Similarly, a height of the plurality of spacer is the same, which can support the color filter plate substrate 10 and the array substrate 30 and ensure an equal distance between the color filter plate substrate 10 and the array substrate 30.

The array substrate 30 includes a thin film transistor (TFT) 31 and a metal wire 33, the spacer is disposed on a black matrix 13 of a position corresponding to the TFT 31 and metal wire 33.

The spacer is also disposed on a black matrix 13 of a position corresponding to a peripheral region of the array substrate 30, a contact area of the spacer corresponding to the TFT 31 and metal wire 33, and the black matrixes 13 is larger than a contact area of the spacer corresponding to the peripheral region of the array substrate 30 and the black matrixes 13. Therefore, a contact area of the spacer and the black matrixes 13 is enlarged merely in a laser radiation region, which can protect the black matrixes 13 from leakage formation due to the laser, as well as consuming less materials of the protective layer 15.

In the embodiment, distribution of the each spacer corresponding to the TFT 31 and metal wire 33 is more compact than that of the each spacer corresponding to the peripheral region of the array substrate 30.

Distinguishing from a conventional technique, the protective layer 15 is disposed on a side of the black matrix 13 oriented to the array substrate 30 in a laser incidence region during laser repair according to the disclosure, therefore, during repair process of the display panel 100, the preventive layer 15 can protect the black matrixes 13 during laser repair from forming a through-hole on the black matrix that can leak light. Meanwhile, distribution density of the spacer only in the laser radiation region is reduced to increase contact area of the spacer and the black matrixes 13, the black matrixes 13 can be protected from leakage due to laser and materials of the protective layer 15 are less consumed.

Figure 2:
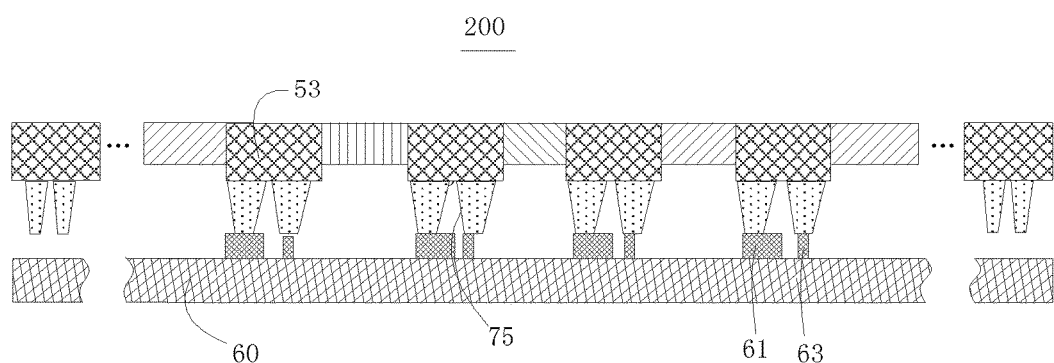
FIG. 2 is a structural diagram of a display panel according to a second embodiment of the present disclosure.

Referring to FIG. 2, difference of a display panel 200 according to a second embodiment of the disclosure and that according to the first embodiment is: a contact area of each spacer corresponding to a TFT 61 and a metal wire 63, and black matrixes 53 is larger than a contact area of the each spacer corresponding to the peripheral region of array substrate 60 and the black matrixes 53.

Distinguishing from a conventional technique, a protective layer 75 is disposed on a side of the black matrix 53 oriented to the array substrate 60 in a laser incidence region during laser repair according to the disclosure, therefore, during repair process of the display panel 200, the preventive layer 75 can protect the black matrixes 53 during laser repair from forming a through-hole on the black matrix 53 that can leak light. Meanwhile, distribution density of the spacer only in the laser radiation region is reduced to increase contact area of the spacer and the black matrixes 53, the black matrixes 53 can be protected from leakage due to laser and materials of the protective layer 75 are less consumed.

Above are embodiments of the present invention, which does not limit the scope of the present invention. Any modifications, equivalent replacements or improvements within the spirit and principles of the embodiment described above should be covered by the protected scope of the invention.

What is claimed is:

1. A display panel, wherein the display panel comprises:
   a color filter plate substrate and an array substrate;
   the color filter plate substrate comprises a black matrix and a protective layer;
   the color filter plate substrate and the array substrate are disposed opposite;
   the protective layer is disposed on a side of the black matrix oriented to the array substrate in a laser incidence region;
   wherein the protective layer is formed by a plurality of alternate spacers disposed on the black matrix layer;
   wherein the array substrate comprises a thin film transistor (TFT) and a metal wire, a spacer is disposed on the black matrix of a position corresponding to the TFT and metal wire;
   wherein distribution of the each spacer corresponding to the TFT and metal wire is more compact than that of the each spacer corresponding to the peripheral region of the array substrate.

2. The display panel according to claim 1, wherein the protective layer is an organic material layer.

3. The display panel according to claim 1, wherein the spacer is disposed between the black matrix and the array substrate, and a contact area of the spacer and the black matrix which corresponding to the position of the TFT and the metal wire are larger than a contact area of the spacer and the black matrix which corresponding to the position of the array substrate exposure area.

4. The display panel according to claim 3, wherein a contact area of the spacer corresponding to the TFT and metal wire, and the black matrix is larger than a contact area of the spacer corresponding to the peripheral region of the array substrate and the black matrix.

* * * * *